(12) United States Patent
Tang et al.

(10) Patent No.: US 8,938,477 B1
(45) Date of Patent: Jan. 20, 2015

(54) SIMULATING DATA STORAGE SYSTEM CONFIGURATION DATA

(71) Applicants: Xuan Tang, Hopkinton, MA (US); Yong Wang, Westborough, MA (US); Ken Kim, Worcester, MA (US); Lorenzo Bailey, Framingham, MA (US); Utkarsh Vipul, Westborough, MA (US); Ping Zhang, Shrewsbury, MA (US); Ying Xie, Northboro, MA (US)

(72) Inventors: Xuan Tang, Hopkinton, MA (US); Yong Wang, Westborough, MA (US); Ken Kim, Worcester, MA (US); Lorenzo Bailey, Framingham, MA (US); Utkarsh Vipul, Westborough, MA (US); Ping Zhang, Shrewsbury, MA (US); Ying Xie, Northboro, MA (US)

(73) Assignee: EMC Corporation, Hopkinton, MA (US)

( * ) Notice: Subject to any disclaimer, the term of this patent is extended or adjusted under 35 U.S.C. 154(b) by 113 days.

(21) Appl. No.: 13/627,195

(22) Filed: Sep. 26, 2012

(51) Int. Cl.
*G06F 17/30* (2006.01)
(52) U.S. Cl.
USPC .......................................... 707/803; 707/769
(58) Field of Classification Search
CPC ..... G06F 3/064; G06F 3/0667; G06F 3/0689;
G06F 7/00; G06F 9/455; H04L 67/1097;
H04L 49/357; H04L 69/40
See application file for complete search history.

(56) References Cited

U.S. PATENT DOCUMENTS

| | | | |
|---|---|---|---|
| 7,533,128 B1 * | 5/2009 | Sanchez et al. | 1/1 |
| 8,024,171 B1 * | 9/2011 | Korolev | 703/24 |
| 8,346,788 B1 | 1/2013 | Kim | |
| 2002/0103889 A1 * | 8/2002 | Markson et al. | 709/223 |

OTHER PUBLICATIONS

U.S. Appl. No. 12/928,653 for "Techniques for Performing Indication Management", filed Dec. 15, 2010.
U.S. Appl. No. 13/065,631 for "Techniques for Providing a Consolidated System Configuration View Using Database Change Tracking and Configuration Files", filed Mar. 25, 2011.
U.S. Appl. No. 13/135,080 for "Techniques for Performing Indication Management", filed Jun. 24, 2011.

* cited by examiner

*Primary Examiner* — Anteneh Girma
(74) *Attorney, Agent, or Firm* — Muirhead and Saturnelli, LLC

(57) ABSTRACT

Described are techniques for simulating a data storage configuration. First data is generated that describes a simulated data storage configuration. A database is populated using the first data. First information is retrieved from the database in connection with processing a request from a client. The first information includes at least a portion of the first data.

20 Claims, 12 Drawing Sheets

SIMULATING DATA STORAGE SYSTEM CONFIGURATION DATA

BACKGROUND

1. Technical Field

This application relates to techniques used in connection with simulation of data storage system configuration data.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Management software may be used in connection with management of data storage systems. Testing and development of such management software may require using data storage management configuration data that define or describe a valid data storage system configuration.

SUMMARY OF THE INVENTION

In accordance with one aspect of the invention is a method for simulating a data storage configuration comprising: generating first data describing a simulated data storage configuration; populating a database using said first data; and retrieving first information from said database in connection with processing a request from a client, wherein said first information includes at least a portion of said first data. One or more code modules may be included in a runtime execution path of code modules executed in connection with processing said request and retrieving said first information. The one or more code modules may be tested using the simulated data storage configuration information. The simulated data storage configuration may be described using a database schema. The first data may be generated using a simulation tool which receives the database schema as a first input. The database schema may be a template describing one or more database tables and columns of the one or more database tables. each row in each of the one or more database table may represent an object. Each row may include a first field identifying a primary key used to index into said each database table and to uniquely identify the object in said each database table. The row for the object may include one or more additional fields identifying one or more corresponding properties of the object identified by the row. The simulation tool may receive a second input including second data which describes the simulated data storage configuration and may be used to populate the database. The second input may be in accordance with the database schema. The simulation tool may use the first input and the second input in connection with generating the first data describing the simulated data storage configuration. The database schema may be specified using the first input which is a file including metadata describing one or more database tables and columns of the one or more database tables. The second data may define instances of a first set of one or more objects of the one or more database tables. The second data may include, for each object of the first set included in a first of the one or more database tables, a first value for a primary key of the first database table and a value for each additional property of said each object in accordance with the database schema. The first database table may be a table of RAID groups. Each row of the first table may correspond to an object representing one RAID group instance. Each row of the first table may include a set of properties identifying physical devices of the one RAID group instance. The set of properties may include a set of foreign keys which are used to index into a second database table of physical devices. Each foreign key in the set of foreign keys may be a value for a primary key of the second database table. Each foreign key may uniquely identify a row in the second database table describing a physical device of said one RAID group instance. The second data may specify one or more values for object properties whereby the one or more values may override default values automatically specified by the simulation tool and wherein the simulation tool may automatically provide default values for properties and any required objects so that the first data describes the simulated data storage configuration as a valid and consistent configuration.

In accordance with another aspect of the invention is a system comprising: a simulation tool that generates first data describing a simulated data storage configuration; a database including said first data describing said simulated data storage configuration; and one or more other code modules that retrieve first information from said database in connection with processing a request from a client, wherein said first information includes at least a portion of said first data.

In accordance with yet another aspect of the invention is a computer readable medium comprising code stored thereon for simulating a data storage configuration, the computer readable medium comprising code for: generating first data describing a simulated data storage configuration; populating a database using said first data; and retrieving first information from said database in connection with processing a request from a client, wherein said first information includes at least a portion of said first data. A simulation tool may generate the first data using a first input describing a database schema of said database and a second input describing data used to populate tables of said database in accordance with the database schema. The tables of the database may include a first table of RAID groups and a second table of physical devices. Each row of the first table may describe one of the RAID groups and may identify a set of one or more physical devices of the second table included in the one RAID group. Each row of the first table may include a primary key uniquely identifying a row in the first table for the one RAID group and may include values for object properties of the one RAID group. The tables of the database may include a first table of RAID groups, a second table of physical devices, and a third table of associations between RAID groups of the first table and physical devices of the second table.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
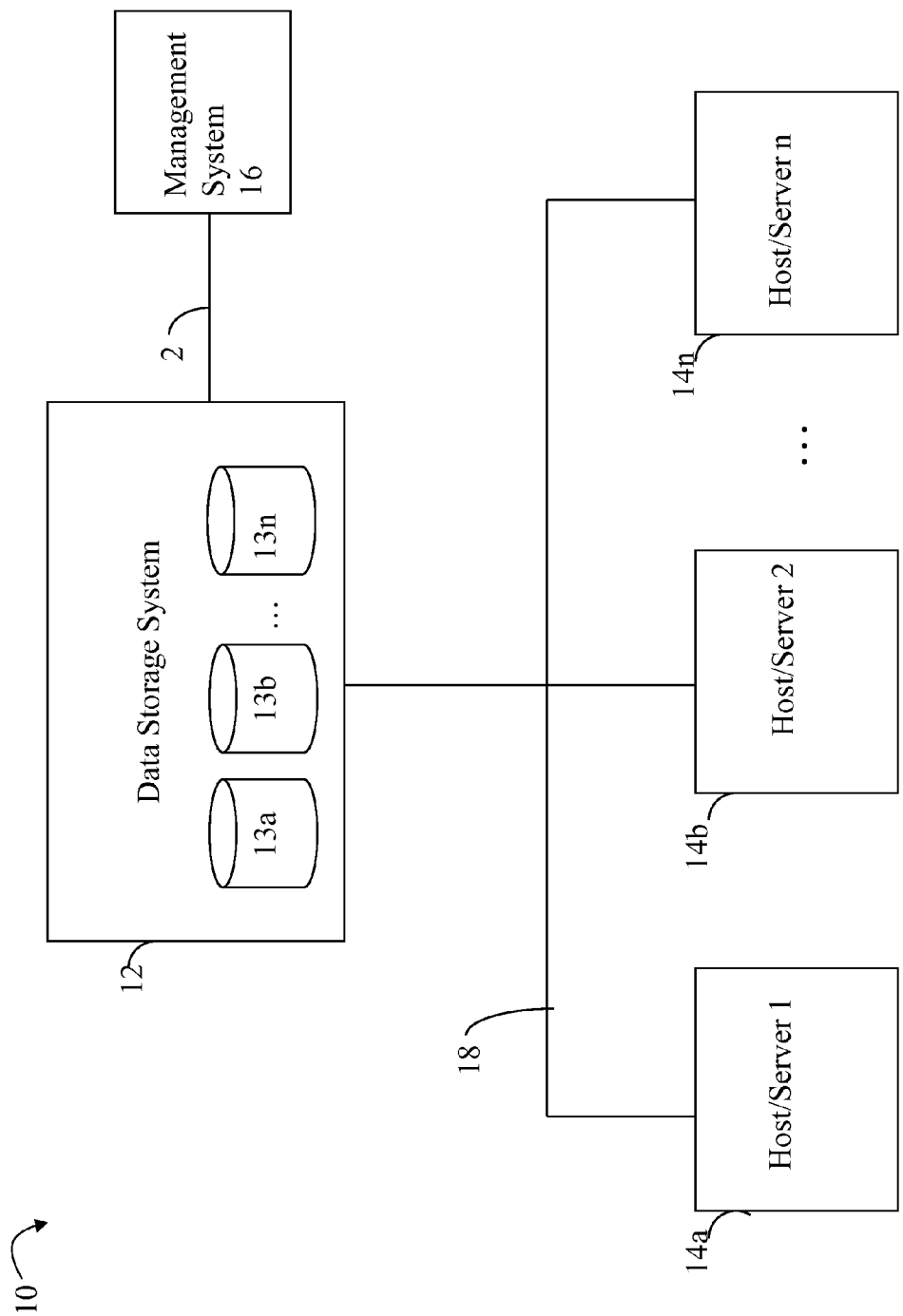
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
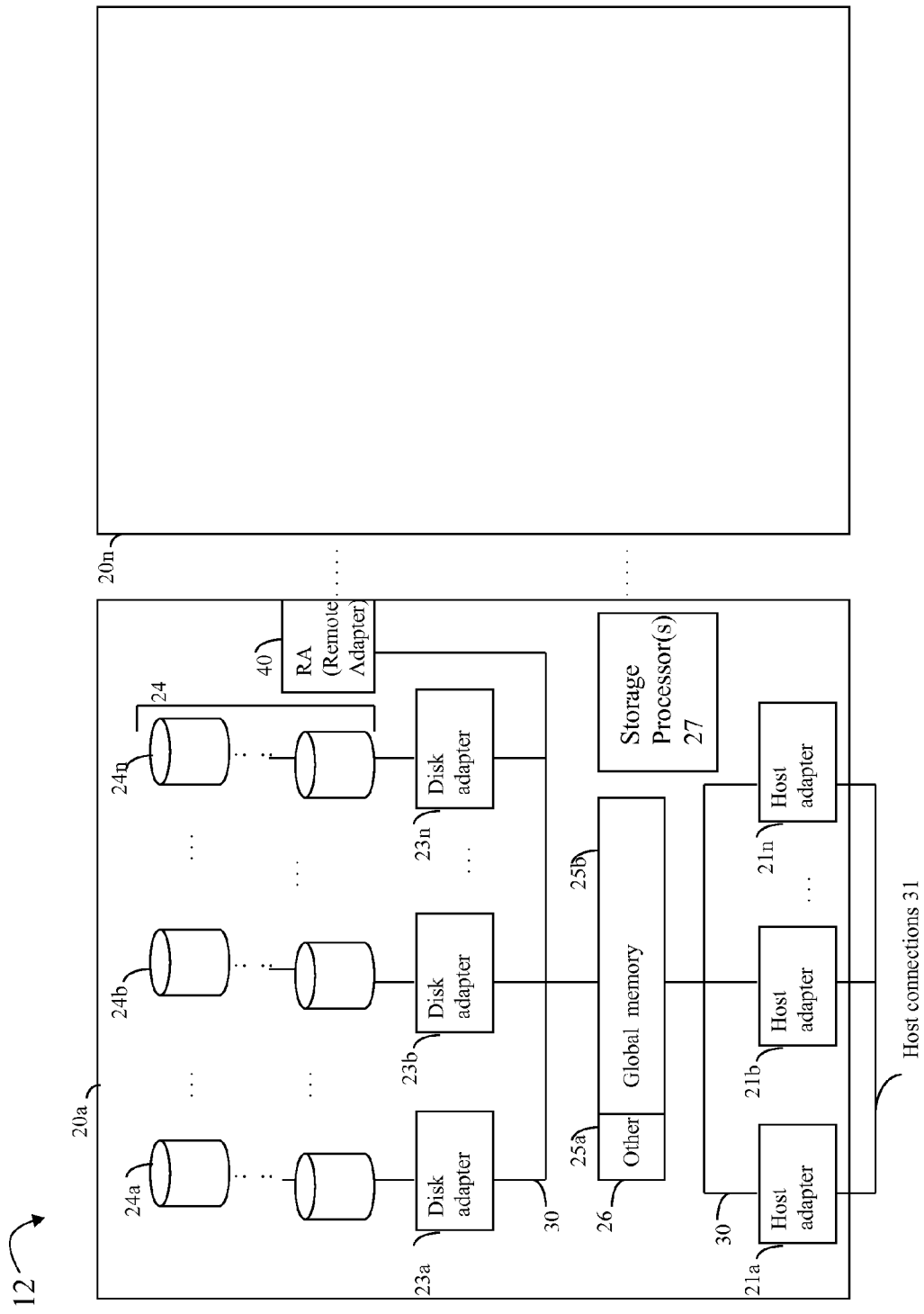
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the VNX® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Management software may execute on the data storage system and/or management system which describes the current state and configuration of the data storage system. A client, such as a user interface (UI) included in the management system 16 used by an administrator in connection with data storage management, may receive data storage configuration information from other software executing on the data storage system. Such information may include an initial set of information that may be displayed using the UI as well as any updated configuration information that may occur over time. In this manner, the UI may display the initial set of information and then display such updated configuration information based on changes that may occur in the data storage system configuration over time. The UI used in connection with management of data storage systems may register to receive notifications regarding the occurrence of one or more system events. Notification of such events may include, for example, notification regarding data storage configuration changes (e.g., when a LUN is created/added or has a property thereof modified), when existing unused storage capacity is a threshold level, when a hardware or software component has a state change associated with a problem (e.g., power failure, unable to read/write to a physical or logical device), and the like. Any suitable technique may be used in connection with indication management and providing indication notification to a client such as the UI of the data storage management software.

An embodiment may use one or more object-based models although other embodiments in accordance with techniques herein may use different data model(s). In such an embodiment using an object-based model, registration and notification of the client, such as the UI of the data storage management software, may be performed with respect to objects, an attribute or property of an object, and/or a class of objects. The object may correspond to, and represent the state of, a physical or logical entity in the data storage system. For example, an object may represent a physical component such as a fan, power supply, port, or physical storage device. The physical component may be characterized by state information represented as properties or attributes of an object. For example, an object corresponding to a physical storage device may have attributes representing the total available storage capacity, an amount of unused or free storage capacity, physical device characteristics, and the like. An object may also represent a logical entity such as a RAID group, LUN or LV, storage group of one or more LUNs, and the like. A logical entity such as a RAID group may be represented by an object having attributes such as indicating a RAID level of the RAID group (e.g., RAID-0, 1, 5, or 6), a number of data and/or parity drives, and the like.

In one embodiment, the object model of the client may be in accordance with a standard such as the CIM (Common Information Model) standard. Clients, such as the UI described above, may register to receive indication notifications regarding any one or more type of events regarding the objects. A client may register to receive notification regarding different levels and/or categories of changes. For example, a client may register to receive notifications regarding changes to any object, changes to one or more specified objects (e.g., changes to any attribute of the specified objects), changes to one or more specified attributes of an object, when any new object is created, when any object is deleted, and the like. A client may also register to receive class-level indications such as with respect to a class of objects. For example, a client may register to receive notification when a new object in a specified class is created, when an object in a specified class is deleted, when there is any change to an attribute of an object of a specified class, and the like. The foregoing, as well as other criteria, may be used in connection with client subscriptions specified during a registration process.

The registration criteria and clients may use a first data model that is an object model as described above. As will be described in more detail in following paragraphs, information regarding the state of entities in the data storage system may be initially obtained and described in accordance with a second data model different from the first data model. Using techniques herein, one or more data elements of the first data model may be mapped to corresponding one or more data elements in the second data model, and vice versa.

In connection with the data storage management configuration software, or more generally, software which uses data storage system configuration data, different valid data storage configurations may be required for use, for example, for tasks such as software testing and development. Such valid data storage configurations may be generated based on actual underlying physical configurations of data storage systems and components. Thus, some techniques for testing and development data storage management software may require such physical systems and actual configuring the physical systems to have the various configurations and states needed for testing. However, requiring the actual physical data storage systems and that such systems be configured to test the software may have drawbacks. For example, the cost associated with acquiring such systems and associated configurations needed for testing may be unacceptable and/or undesirable. Furthermore, physical data storage systems may not be readily available, for example, if the physical data storage systems are also under development. Additionally, the physical data storage systems, even if available and acquired, require physical space within which to locate the systems for testing. Such physical space may not be available.

What will be described in following paragraphs are techniques that may be used to simulate generation of data storage configuration data. In some embodiments, a simulation tool may be used to generate simulated or virtual data storage configuration data. The data storage configuration data may represent information about a valid and consistent configuration. However, the tool may generate various sets of the configuration data needed for testing without the existence of underlying hardware and physical components and systems having the actual configuration described by the configuration data. Thus, the configuration data for the data storage system may be characterized as virtual or simulated in that it represents a virtual or simulated data storage configuration without requiring any of the underlying hardware and/or associated actual configurations. Prior to describing the techniques for simulating data storage configurations, what will first be described is one embodiment of data storage management components and how such components may operate. Subsequently, the techniques for simulating data storage configurations will be described with reference to the particular data storage management components of this embodiment.

Figure 3:
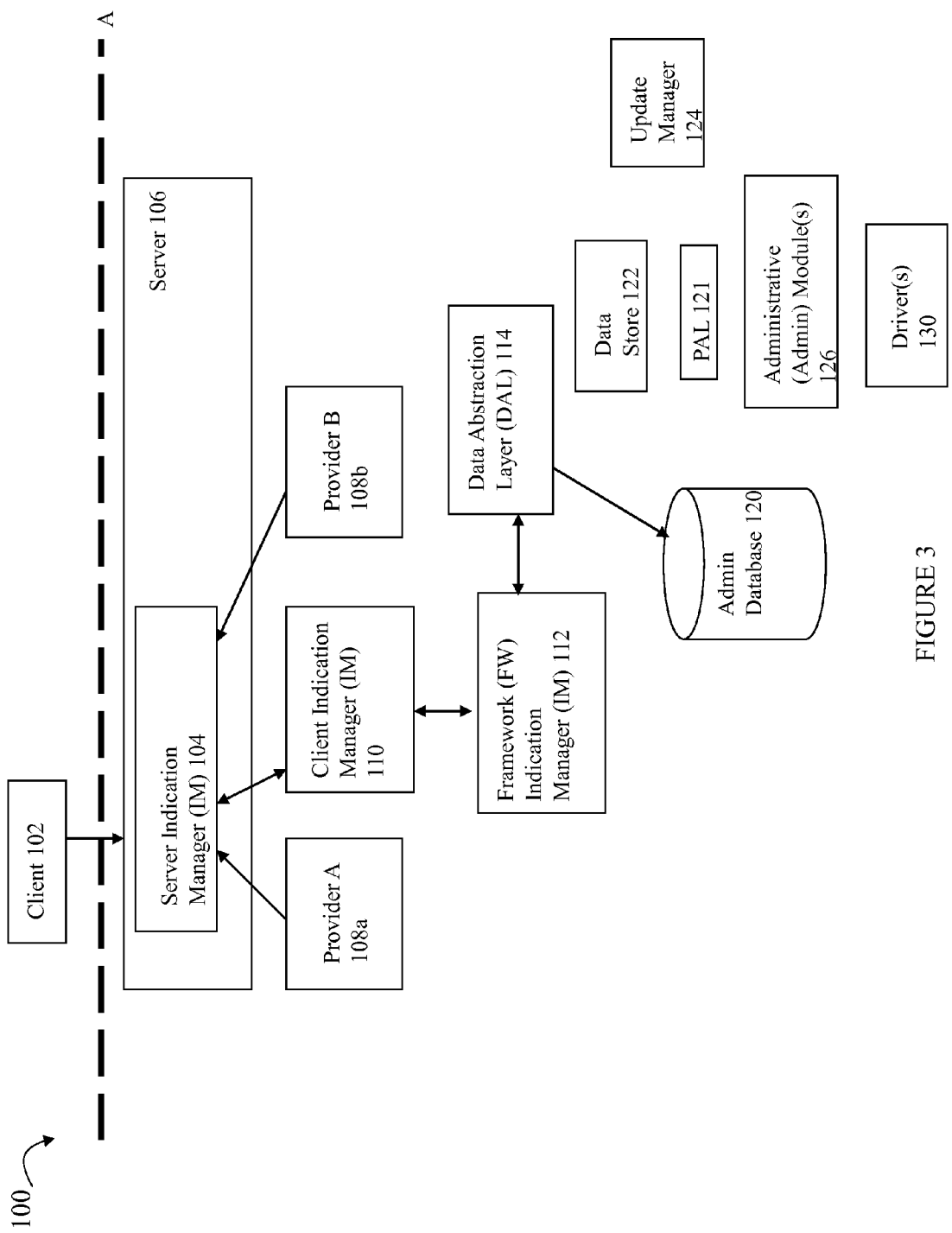
FIG. 3 is an example illustrating data flow and communications between components in an embodiment in accordance with techniques herein when performing indication registration processing.

Referring to FIG. 3, shown is an example of a components that may be included in an embodiment of data storage management software. The example 100 includes components of the data storage system and an external client 102 used to illustrate how indication registration may be performed. As described in more detail below, the arrows indicate the data flow and communications that may be performed with respect to the illustrated components in connection with indication registration in an embodiment in accordance with techniques herein. The dashed line denoted as A may represent a partitioning of components included in the data storage system (e.g., those below the dashed line A) and those which are external to the data storage system (e.g., those above the dashed line A). The example 100 includes a remote or external client 102, server 106, server indication manager (IM) 104, providers 108a, 108b, client IM 110, framework IM 112, data abstraction layer (DAL) 114, platform abstraction layer (PAL) 121, admin (administrative) database 120, data store 122, update manager 124, admin software module(s) 126, and driver(s) 130. A client, such as external or remote client 102, may register with the server IM 104 to receive notifications with respect to events in the represented data storage system.

Providers 108a, 108b may also register as a data storage system internal clients to receive notifications by communicating with server IM 104. In connection with client registration, each client may specify registration criteria identifying the objects, attributes, and/or classes and types of operations on objects and/or classes (e.g., creation, deletion, changes or modifications) about which the client is to be notified. As part of external client registration, such registration criteria may be transmitted from the external client 102 to the server IM 104 and then to the client IM 110. As part of internal client registration, such registration criteria may be similarly transmitted from the internal clients, such as providers 108a, 108b, to the server IM 104 and then to the client IM 110. The client IM 110 may then further communicate client registration criteria, along with possibly other information, to the FWIM 112. In one aspect, client 102 and providers 108a and 108b are registered subscribers of the server IM 104. Furthermore, server IM 104 may be characterized as a registered subscriber of client IM 110 and client IM 110 may be characterized as a registered subscriber of FWIM 112. The foregoing description regarding server IM 104, client IM 110 and FWIM 112 may be characterized as describing a hierarchy of IMs that may be included in an embodiment in accordance with techniques herein. More generally, an embodiment may include any number of one or more levels of components such as IMs, providers and/or external clients. In this exemplary hierarchy, each IM included in the hierarchy may have any number of subscribers. To further illustrate, a provider, IM, or other "client" may register directly with the client IM. For example, provider 108a or another software component may register directly with the client IM 110 and/or server IM 104. In connection with the foregoing subscription hierarchy, appropriate registration information may be maintained at, and also propagated to, the different levels in the hierarchy to enable proper notification. For example, the external or remote client registration information from client 102 may be propagated to the FWIM 112 along with other information from other direct or indirect subscribers of FWIM 112.

The FWIM 112 may maintain a list of registration criteria for use with techniques herein where the list includes information representing what content, such as data elements, in the object model is monitored in connection with determining whether to send notifications to registered subscriber(s). The list of registration criteria may identify the objects and/or attributes that are registered. More generally, the object model may be characterized as a client object model used by clients of the indication management described herein.

Data describing a state of components of the data storage system may be stored in the admin database 120. Element 120 may represent a database or other data container in which data is stored in accordance with a second data model different from the client object model. The admin database 120 may be stored in a form such as in accordance with a database model. The DAL 114 may be used in connection with mapping data elements from the client object model to the database model, and vice-versa. The FWIM 112 may call the DAL 114 to obtain current values for the registered data elements identified in the registration criteria. The FWIM 112 only obtains values of the attributes, objects and/or classes specified in the registration criteria. The FWIM 112 may pass to the DAL 114 as input parameters the one or more attributes and objects specified in the registration criteria in accordance with the client object model. The DAL 114 may use mapping information to determine one or more data elements of the admin database 120 in accordance with the database model which correspond to those of the input parameters. The DAL 114 may obtain values for the corresponding data elements in accordance with the database model from admin database 120 and return the values to the FWIM 112. The FWIM 112 may then communicate with the IM 110 and possibly other components not illustrated but registered with the FWIM 112 to thereby provide any appropriate indications regarding changes to the client object model due to updates to the admin database 120.

Use of the data store 122, update manager 124, admin module 126 and drivers 130 are described in more detail elsewhere herein. Generally, the drivers 130 collect information which is reported through a call stack of software layers including the admin module(s) 126, PAL 121, and data store 122, where such information may then be stored in the admin database 120.

Information from the database 120 may flow to the client 102 through the runtime path denoted by 120, 114, 112, 110, 104/106, and 102. Information may also be generally requested by the client 102 and returned through the server 106 by one of the providers (such as 108a, 108b). Such providers 108a, 108b may communicate with DAL 114 to retrieve requested information from the database 120 in terms of the client data model as consumed or used by the client 102.

Figure 4:
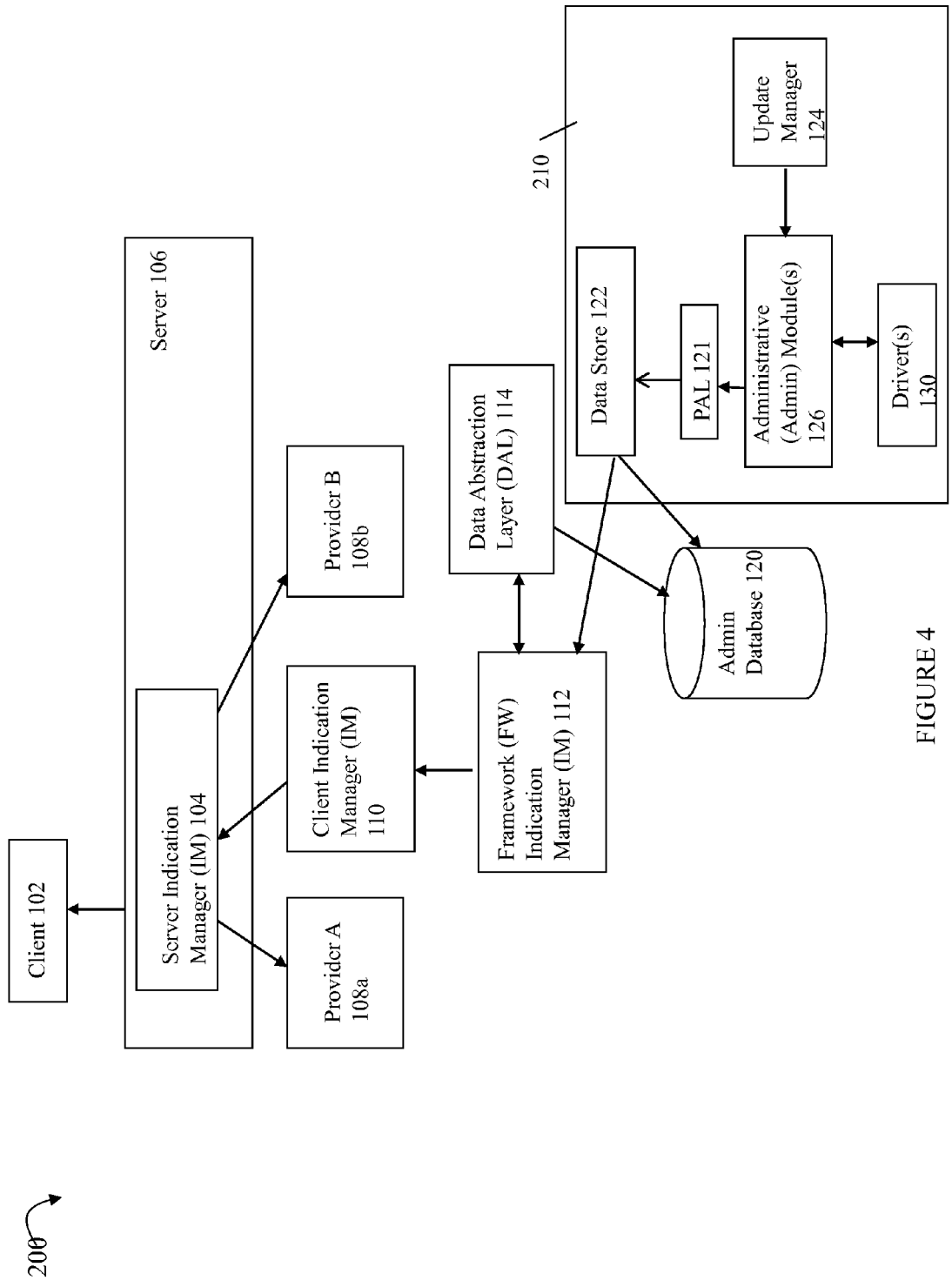
FIG. 4 is an example illustrating data flow and communications between components in an embodiment in accordance with techniques herein when performing indication notification processing.

Referring to FIG. 4, shown is an example of the components of FIG. 3 annotated to indicate data flow and communication between components illustrating how indication notification may be performed in an embodiment in accordance with techniques herein. The update manager 124 may generate a request to poll the drivers 130 for state information. The update manager 124 may generate a polling request in response to an occurrence of a trigger event. The trigger event may be an occurrence of a defined polling interval, as well as an occurrence of one or more other defined events. The update manager 124 may issue the request to the admin modules 126 which then obtain the state information from the drivers 130. The admin modules 126 then communicate the state information to the data store 122. The data store 122 may process the received state information and populate the admin database 120 by performing database operations such as by issuing appropriate database commands including update, insert and/or delete database commands. The admin modules 126 may receive data in the form of object in accordance with an administrative data model which may then be further mapped into the database model. The database model may include data stored in one or more database tables where such tables include one or more rows of data elements. The data store 122 may perform database operations which update the appropriate database tables, and portions thereof, in accordance with the received state information from the drivers 130. The data store 122 may the determine which one or more rows of the database tables have been modified as a result of the performing the database operations to store the received state information. In one embodiment, the data store 122 may use a database transaction log or other suitable technique to track and determine the database table row-level changes and notify the FWIM 112 regarding such changes. The data store 122 may provide the FWIM 112 with a database (DB) key or row identifier (ID) used to identify each row of a database table that has been modified as a result of performing the database operations.

As noted above, the FWIM 112 is notified by the data store 122 as to database table rows affected by update, insert and/or delete operations. The data store 122 may send a DB key or row ID to the FWIM 112 for each such row. In turn, the FWIM 112 may call the DAL 114 supplying the row ID as an input parameter. In response, the DAL 114 may return a list of one or more data elements in the client object model dependent on data elements of the row ID. More specifically, the DAL 114 may return a list of objects in the client object model where each object in the list includes an attribute or property dependent on a data element of the database object model identified by the row ID. The DAL 114 may use the row ID for a database table row to identify one or more data elements of the database model included in the row. The DAL 114 may then map the one or more identified data elements of the database model to one or more other data elements of the client object model. Each of the data elements in the client object model determined by the mapping step is dependent upon one or more of the identified data elements of the database model in the row. The mapping step may identify, for example, one or more object attributes of the client object model which are determined or otherwise dependent on the one or more data elements of the row. From this, the DAL 114 may determine and return to the FWIM 112 a list of the objects of the client object model, each such object having one or more attributes dependent a data element of the database model which is also included in the row. It should be noted that in an embodiment providing support for class level indications, the class of each object may also be identified and returned by DAL to the FWIM 112.

The FWIM 112 then processes the returned list of data elements (e.g., returned object list) from DAL 114 against, or with respect to, the registration criteria to identify data elements of the registration criteria which are also identified in the returned list of data elements (e.g., determine the intersection of data elements with respect to the registration criteria and the returned list of data elements). In particular, the FWIM 112 may compare the objects of the returned object list to identify, for example, objects of the registration criteria matching objects in the returned object list, an attribute of an object in the registration criteria where the object matches an object in the returned object list, and the like. From such processing, the FWIM 112 may identify, for example, a list of object attributes where each such attribute is identified by the registration criteria and also by the returned object list. It should be noted that an attribute may be identified directly or explicitly in the registration criteria, or may be identified indirectly by identifying the object including the attribute. In a similar manner, an object may be identified directly or explicitly in the registration criteria, or may be identified indirectly by identifying a class including the object (e.g. register for one or more types of indications—such as object creation, deletion and/or modification—for a particular class of objects).

Based on the foregoing, the FWIM 112 may determine, for example, those attributes and/or objects that have been modified, newly created objects, and deleted objects. From the foregoing, class-level indications may also be determined as needed in accordance with the registration criteria. Additionally, based on the foregoing, appropriate notifications may be formed and transmitted from FWIM 112 to client IM 110, and from client IM 110 to server IM 104, and from server IM 104 to providers 108a, 108b and/or client 102.

It should be noted that the information included in a notification may vary with embodiment. For example, in an embodiment in accordance with an client object model standard, the standard may specify the information included in the different indication notifications. For example, when a client is registered to receive an indication notification when an object has changed, a notification is transmitted if any attribute value of the object has changed. The notification may be required by the standard to identify all current attribute values of the object even if only a single attribute values has changed.

Figure 4A:
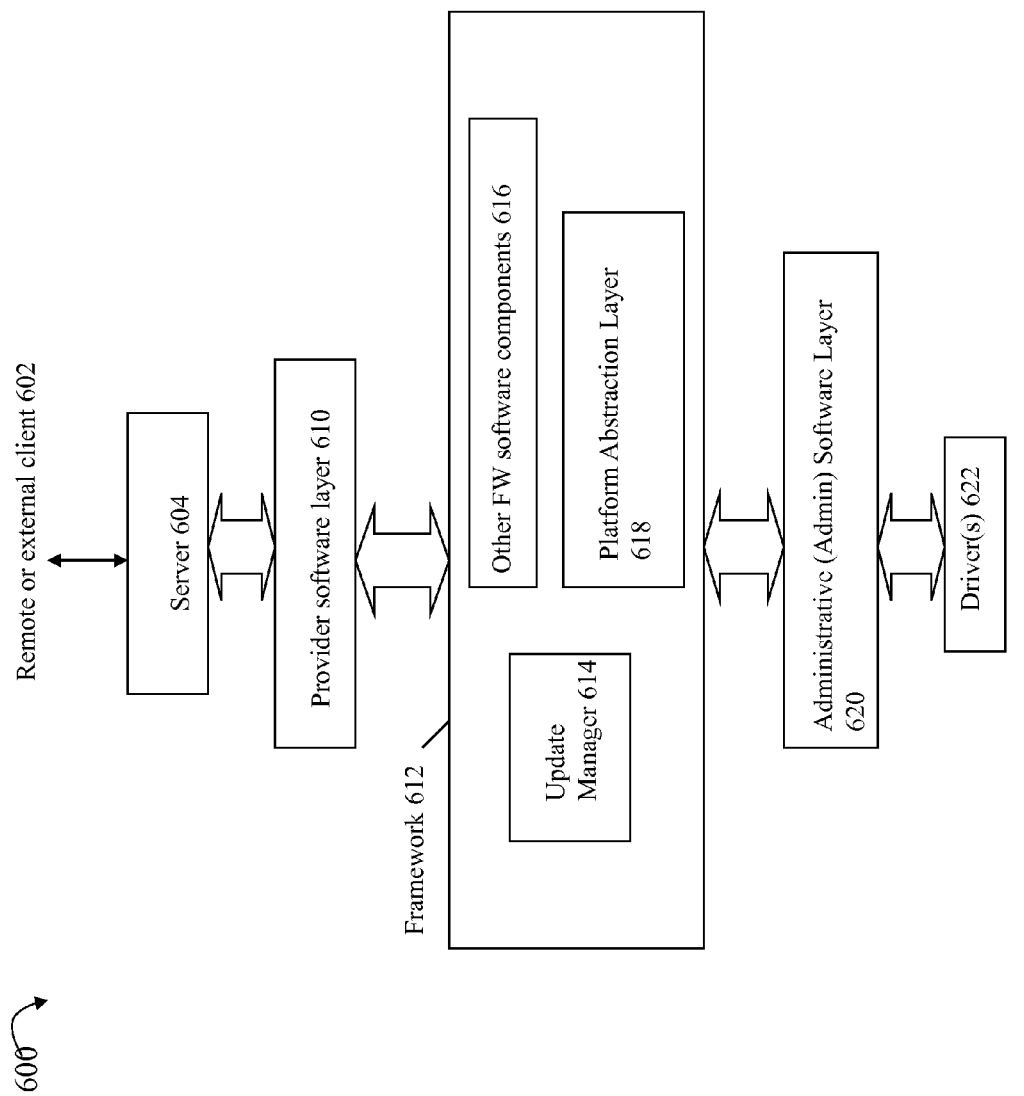
FIG. 4A is another representation of components that may be included in an embodiment in accordance with techniques herein.

Referring to FIG. 4A, shown is another representation of different components that may be used in connection with techniques herein. The example 600 provides another alternative representation including components described in FIGS. 3 and 4. The client 602 may be remote or external with respect to the data storage system which includes server 604, provider software layer 610, framework 612, admin software layer 620 and driver(s) 622. With reference to FIGS. 3 and 4, elements 604, 614, 618, 620 and 622 are respectively analogous to elements 106, 124, 121, 126, and 130. Provider software layer 610 includes, for example, providers 108a, 108b of FIGS. 3 and 4. Framework (FW) 612 may include the update manager 614, a platform abstraction layer (PAL) 618 and other FW software components 616. The PAL 618 may serve as an interface for communications between the FW 612 and the admin layer 620. The element 616 may collectively represent one or more components described in FIGS. 3 and 4 such as, for example, 110, 112, 114, 120, and 122.

With reference to the foregoing such as illustrated and described in connection with FIGS. 3, 4 and 4A, a client 102 may issue a request to the software components on the data storage system in connection with reading and/or writing information in connection with performing a data storage management operation. The management software may have a user interface (UI) such as a graphical user interface (GUI) which is a client 102 that displays configuration information in connection with the current data storage system configuration. Examples of such information are described elsewhere herein. The GUI may issue an initial request to retrieve information used to populate the display. Additionally, techniques such as the above-mentioned indications may be used to provide notifications to the client regarding configuration data updates for the particular information being displayed on the GUI. In this manner, the GUI may display an initial set of information and update such displayed information based on any data configuration updates that occur.

With reference to FIG. 4A, the runtime flow path in which information is requested by the client and also returned to the client from the database 120 of the FW 612 may be represented generally by the path including elements 602, 604, 610, and 612. The database 120 is included in the FW 612 and information is propagated for storage into the database 120 from lower layers 622 to 620 and then to PAL 61. Element 210 of FIG. 4 illustrates in more detail the data flow and components used in connection with populating the database 120. Thus, the components of element 210 may represent an example of components which are included in a runtime software stack below the database 120. The other components of FIG. 4 may be characterized as those which are included in the runtime software stack above the database 120 which may be consume or utilize the information of the populated database 120.

In one embodiment in connection with techniques herein, components of 210 may be replaced with a simulation tool that generates simulated data storage configuration data which is used to populate the database 120. In this manner, the lower level components as represented by 210, along with the underlying physical data storage systems and associated physical components, may be replaced with the simulation tool. Thus, the simulation tool generates simulated data storage configuration information. In another aspects, the simulation tool also simulates operation of the software components of 210 which are replaced and also simulates the underlying physical data storage configuration represented by the data storage configuration information generated by the tool. Thus, the simulation tool in such an embodiment may be used in connection with testing and developing code generally included in the runtime software stack above the database 120 (e.g., to test software which reads or inputs data from the database 120).

It should be noted that although the techniques herein use a simulation tool to generate configuration data and simulate operation and processing of the components of 210, an embodiment may also use a tool which generates configuration data produced as an output in accordance with a different number of components based on a different level in the software runtime stack. For example, an embodiment may use a simulation tool which replaces (e.g., simulates) operation of only the drivers 130 and the underlying physical data storage system components. In this case, the simulation tool would "plug in" to the software runtime stack at the point below the admin modules 126 thereby effectively replacing the drivers 130 and the underlying physical data storage systems and components. Such a simulation tool may be used to test software in layers above the drivers 130 (e.g., test components 124, 126, 121, 122 of element 210 and other components which are included in the runtime software stack above the database 120. In a similar manner and as yet another variation, a simulation tool may also generate data and replace different ones of the runtime software stack (e.g., plug into the PAL layer 121 thereby replacing and simulating operation of modules 124, 126, 130 and the underlying physical data storage systems and components, plug into the driver layer 130 thereby replacing and simulating operation of the underlying physical data storage systems and components, and the like). In this manner, more generally, components which are included in the stack above the point at which the simulation tool plugs into the runtime stack may be testing using the simulation tool.

Figure 5:
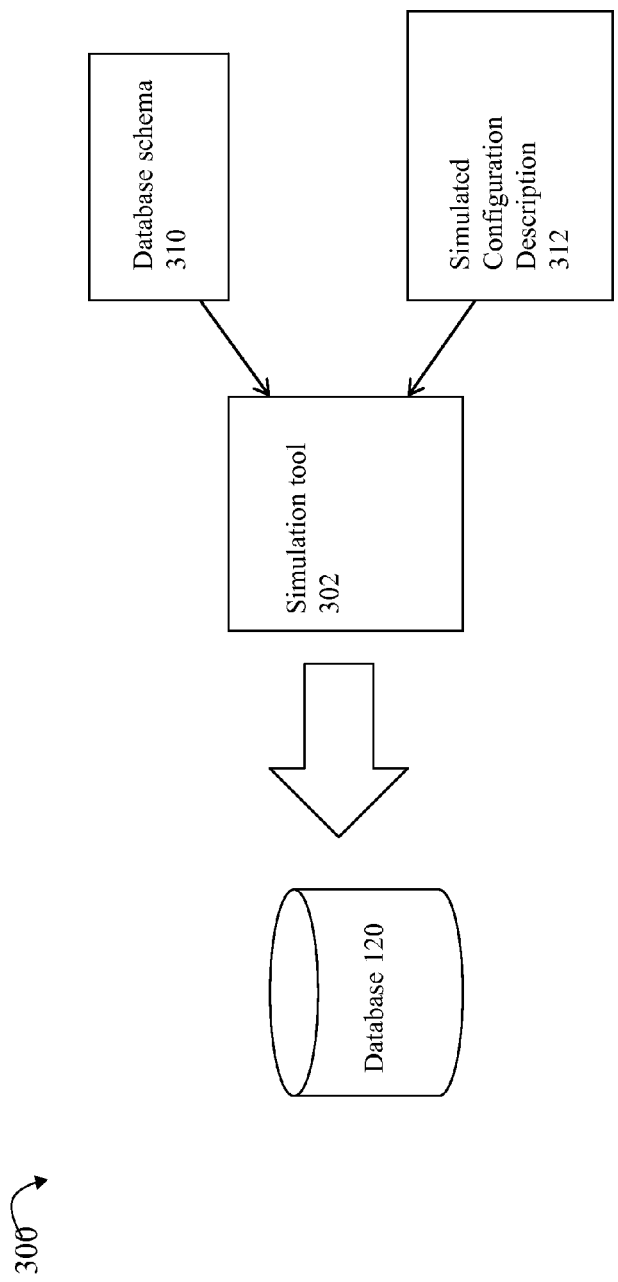
FIG. 5 is an example of inputs that may be provided to the simulation tool to generate simulated configuration data used to populate the database in an embodiment in accordance with techniques herein.

Referring to FIG. 5, shown is an example 300 illustrating components that may be used in an embodiment in accordance with techniques herein. The example 300 includes the database 120 of FIG. 4, and the simulation tool 302. In this example, the simulation tool 302 may be a software component that generates data used to populate the database 120 directly. Thus, in one aspect, the simulation tool 302 replaces the components of 210 of FIG. 4 and generates simulated data storage configuration data. In this manner, the simulation tool 302 may be used to test software components in the stack above the database layer 120.

The simulation tool 302 may use inputs including a database schema 310 and a simulated data storage configuration description 312. The database schema 310 may be characterized as a template or metadata defining the structure of tables included in the database 120 (e.g. providing the schema definition). For example, the database schema 310 may be a data file describing one or more tables of the database for which the simulation tool 302 generates simulated configuration data. For example, the database schema 310 may describe the name and format of a database table including the number of columns of the table, the type of data included in each column, and the like. In one embodiment as described herein using an object-based model for the database 120, a row of a table may represent an object. Each column or field of the row may represent an attribute or property of the object.

It should be noted that an embodiment of the simulation tool may use other suitable means known in the art besides files to provide inputs as illustrated in FIG. 5 to the simulation tool. For example, an embodiment may use a user interface such as with an interactive dialog or wizard to obtain user inputs in connection with describing the simulated data storage configuration. This is illustrated in more detail in connection with following paragraphs and figures.

Figure 6:
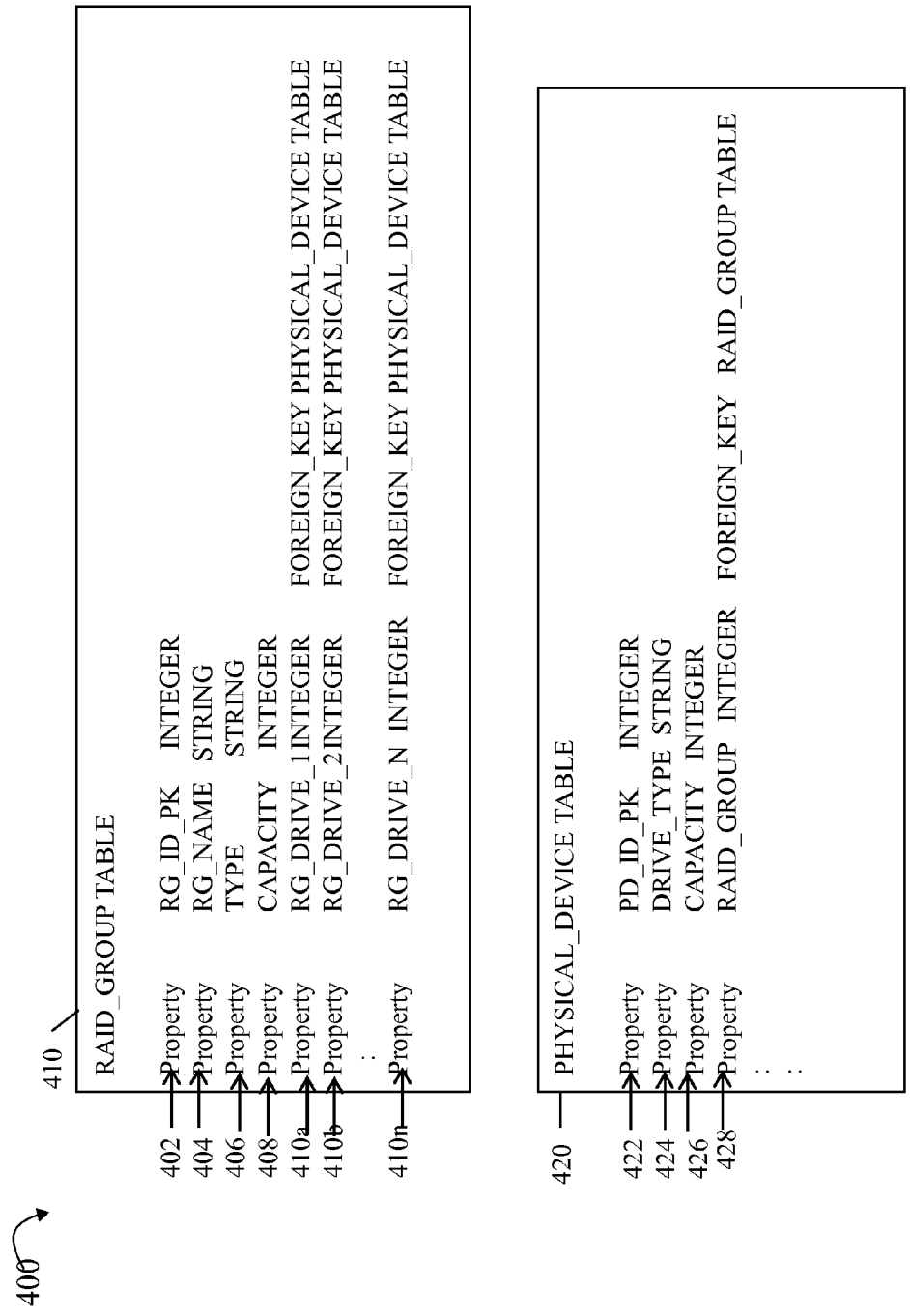
FIGS. 6 and 8 are examples of database schema that may be used in an embodiment in accordance with techniques herein.

Referring to FIG. 6, shown is an example representation of information that may be included in a database schema provided as an input to the simulation tool in an embodiment in accordance with techniques herein. FIG. 6 provides additional detail regarding information that may be included in input 310 of FIG. 5. The example 400 includes only two exemplary tables of the database that may be described by the schema. As will be appreciated by those skilled in the art, the database schema may include a similar description for each table of physical and/or or logical entities of the database. The example 400 includes a description 410 for a RAID_GROUP TABLE and a description 420 for a PHYSICAL_DEVICE TABLE.

Element 410 may describe the properties included for each RAID GROUP object included in the RAID_GROUP TABLE. As known in the art, a RAID (redundant array of independent disks) group is a logical grouping of multiple physical drives. Data may be distributed across the physical drives of the RAID group based on a defined RAID level or configuration. Different RAID levels are known in the art such as, for example RAID-0 (e.g., block level striping without parity or mirroring thereby providing no redundancy), RAID-1 (e.g., mirroring without parity or striping whereby data is written identically to two drives providing a mirrored set), RAID-5 (e.g., block level striping with distributed parity), RAID-6, (e.g., block-level striping with double distributed parity), and the like. Thus, a RAID group may include one or more physical device or drive (PD) members depending on the RAID-level. Each In the example 410, each RAID group includes the following properties:

RG_ID_PK 402 of type integer denoting an identifier uniquely identifying this particular object or row of the table 410. This is the primary key of the table 410.

RG_NAME 404 of type string denoting a named identifier for the RAID group described by this object.

TYPE 406 of type string denoting the RAID-level such as RAID-0, RAID-1, RAID-5, RAID-6 and the like.

CAPACITY 408 of type integer denoting the capacity of the RAID group described buy this object. The capacity may be in storage units such as GBs.

RG_DRIVE_1 through RG_DRIVE_N 410*a*-410*n*, each of type integer and each denote an instance or object representing a PD that is a member of the RAID group described by this object. Each of these properties 410*a-n* is further described in the schema by "FOREIGN_KEY PHYSICAL_DEVICE TABLE" identifying that each property 410*a-n* is a foreign key used to index into, and identify an instance of, a PD in the PHYSICAL DEVICE TABLE described by 420. The foregoing foreign keys may be used to define associations or relationships between entities in the tables 410, 420. Generally, a foreign key included in one table may represent a primary key with respect to another different database table.

Element 420 may describe the properties included for each PHYSICAL DEVICE object included in the PHYSICAL DEVICE TABLE. Each physical device described by an entry or row in the table 420 may include the following properties:

PD_ID_PK 422 of type integer denoting an identifier uniquely identifying this particular object or row of the table 420. This is the primary key of the table 420.

DRIVE_TYPE 424 of type string denoting a type of the physical drive. For example, a PD may be any one of a set of multiple types of drives supported by a data storage system such as Fibre channel 10K RPM rotating disk drives (FC_10K), Fibre channel 15K RPM rotating disk drives (FC_15K), SATA rotating disk drives (SATA), flash or solid state storage devices (FLASH), and the like.

CAPACITY 426 of type integer denoting the physical storage capacity of the PD. The capacity may be in storage units such as GBs (gigabytes).

RAID_GROUP 428 of type integer denoting the particular RAID group to which this PD is a member. It should be noted that property 428 may be null or empty if the PD is not included or configured into any RAID group. Additionally, "FOREIGN_KEY RAID_GROUP TABLE" denotes that property 428 is a foreign key used to index into, and identifies an instance of, a RAID group object in the RAID GROUP TABLE described by 410. The foreign key of 428 may be used to define the RAID-GROUP-PD association between entities in the tables 410, 420.

Figure 7:
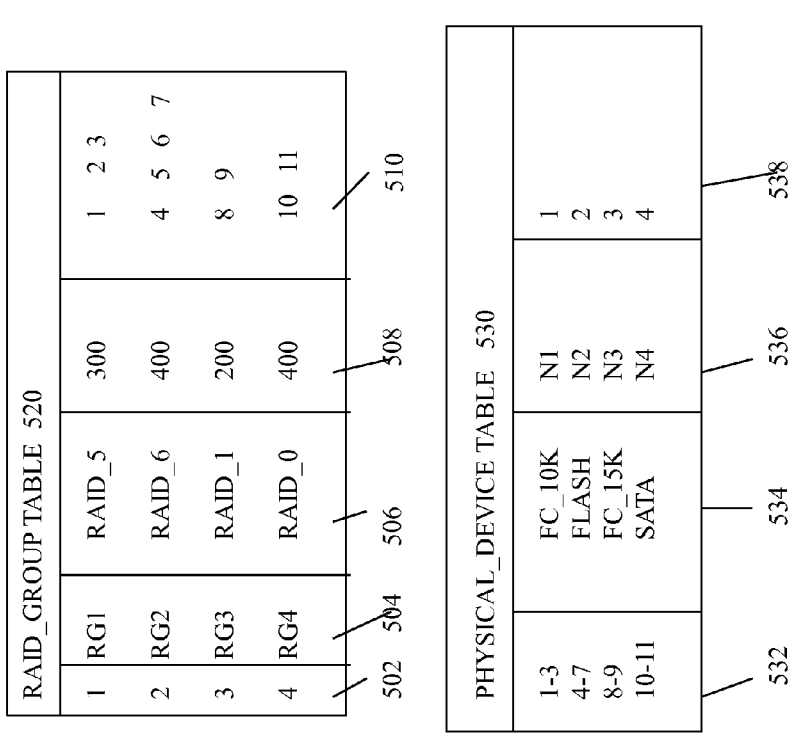
FIGS. 7 and 9 are examples of simulated configuration descriptions that may be used to specify objects and property values in an embodiment in accordance with techniques herein.

Referring to FIG. 7, shown is an example of a simulated configuration description that may be provided as an input to the simulation tool in connection with generating simulated configuration data used to populate the database. FIG. 7 provides additional detail regarding information that may be included in input 312 of FIG. 5. The example 500 includes data used to specify object instances of RAID groups of the RAID GROUP TABLE 410 and PDs of the PHYSICAL DEVICE TABLE 420. Thus, the data storage configuration description in the example 500 may provide values for properties of RAID group objects and physical device objects of the simulated data storage configuration.

The example 500 includes element 520 representing information that may be specified for RAID group objects of the simulated configuration and element 530 representing information that may be specified for PDs of the simulated configuration. Element 520 includes property values in accordance with the schema 410 of FIG. 6 which define 4 RAID groups. Each RAID group is represented as an object having a row of information in 520. Columns 502, 504, 506, and 508, respectively, represent values of properties 402, 404, 406 and 408 for each of the 4 RAID groups. The columns represented by 510 denote the particular PDs for each RAID group (e.g., corresponding to properties 410a-410n whereby a RAID group may have a varying number of PDs depending on the particular RAID group level denoting by the TYPE property in column 506.) For example, the first row of table 520 identifies a first RAID group, having a primary key or identifier of "1", having the name "RG1", configured to have a level of RAID-5, with a capacity of 300 GBs. The first RAID group has three PDs denoted by PD identifiers 1, 2 and 3 in column 510, first row of table 520. Each of the foregoing PD identifiers 1, 2 and 3 may correspond to, or be associated with, an object in the PHYSICAL DEVICE TABLE 530 having the PD identifier as the primary key. In this case, the first RAID group having a primary key or identifier of "1" (e.g., the first row of table 520) is associated with the first 3 rows of table 530. In a similar manner, associations are specified for each of the remaining three RAID groups denoted by the remaining 3 rows of table 520.

Element 530 includes property values in accordance with the schema 420 of FIG. 6 which define 11 PDs. Each PD is represented as an object having a row of information in 530. Columns 532, 534, 536, and 538, respectively, represent values of properties 422, 424, 426 and 428 for each of the 11 PDs. The column 538 denotes the particular RAID group to which the PD is associated. In this example, the table 530 includes property values for PDs using a short hand notation in column 532 whereby the row of property values in columns 534, 536 and 538 applies to each PD denoted by an identifier in the range of column 532. For example, row 1 of table 530 includes "1-3" in column 532 denoting that columns 534, 536 and 538 define simulated configuration information for 3 PDs having identifiers or primary keys of 1, 2 and 3 in table 530.

The value of "1" in column 538 of row 1 of table 530 denotes that each of the first 3 PDs are included in (associated with) the first RAID group denoted by row 1 of table 520.

The example description of the simulated configuration data in FIG. 7 provides a representation of a complete description of all property values included in the schema of FIG. 6. Alternatively, the description of the simulated configuration data in FIG. 7 may include an incomplete specification of data such as by omitting particular columns or property values. For example, with reference to FIG. 7, the data storage configuration description for the RAID GROUP table 520 may omit values of columns 502 and 510 and may omit specifying any values for PDs as represented by table 530. An embodiment may have the simulation tool automatically specify any needed default values to provide a complete, valid and consistent set of simulated configuration data. In this manner, the inputs for property values in the description may be used to override any default values which would otherwise be automatically supplied by the simulation tool. For example, continuing with the above-referenced example where only values of columns 504, 506 and 508 are specified in the simulated configuration description, the simulation tool may automatically provide values for 502 and may automatically select a default number of PDs for each RAID group object depending on the particular RAID type or level denoted by column 506. Additionally, the simulation tool may automatically provide property values of table 530 denoting the particular PDs included in each RAID group.

With reference back to FIG. 5, it should be noted that the simulation tool may perform processing in connection with validating the simulated configuration description 312 as consistent with respect to the database schema 310. Additionally, the simulation tool may perform processing in connection with one or more other validation rules for ensuring a consistent and complete simulated data storage configuration. For example, the simulation tool may perform validation to determine whether a suitable number of PDs have been specified for a RAID group given the particular TYPE in column 506. For example, RAID-0 and RAID-1 may require a minimum of two PDs. Such additional validation rules may be encoded internally within coded logic of the simulation tool and/or represented as a set of extracted rules which may be read as another input (not illustrated in FIG. 5) to the simulation tool 302. Such validation rules may relate to other aspects of semantic constraints which may not be otherwise represented in the database schema.

The example illustrated in connection with FIGS. 6 and 7 is one way in which such data may for a simulated configuration may be represented. As a variation, consider an embodiment in which the associations between a RAID group and its PDs are included in a separate database table as will now be described with reference to FIGS. 8 and 9.

Figure 8:
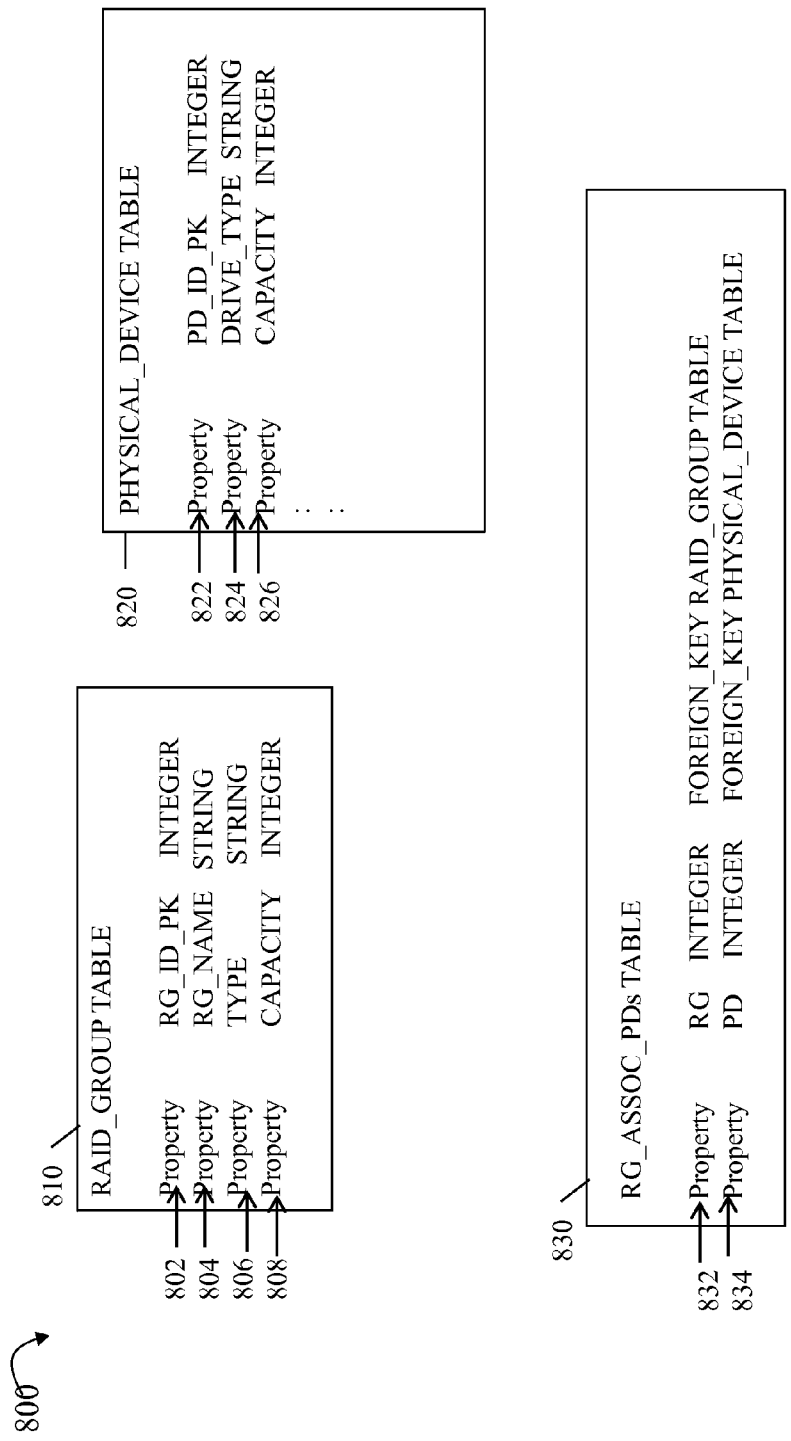

Referring to FIG. 8, shown is an example of database schema that may be used as an input to the simulation tool in an embodiment in accordance with techniques herein. The example 800 provides an alternative for representing the schema described in FIG. 6. Table 810 represents RAID GROUP objects and associated properties. Table 810 includes properties 802, 804, 806, and 808 which are respectively similar to properties 402, 404, 406 and 408 of table 410 of FIG. 6. The properties 410a-410n and associations represented by such properties have been included a separate database table RG_ASSOC_PDs having the schema represented by 830. Element 830 indicates that the table RG_ASSOC_PDs (representing the association between a RAID group and the PDs included in that RAID group) includes property 832 RG of type integer denoting a foreign key in the RAID GROUP table 810 which is associated with the PD denoted by property 834. Property 834, PD, is an integer denoting a foreign key in the PHYSICAL DEVICE table 820.

Table 820 represents PHYSICAL DEVICE objects and associated properties. Table 820 includes properties 822, 824, and 826 which are respectively similar to properties 422, 424, and 426 of table 420 of FIG. 6. The association represented by property 428 (e.g., the association between the PD and its associated RAID group) is now included in the RG_ASSOC_PDs table 830.

Thus, elements 810, 820 and 830 of FIG. 8 provide schema definitions which may be used as an alternative to those provided in FIG. 6.

Figure 9:
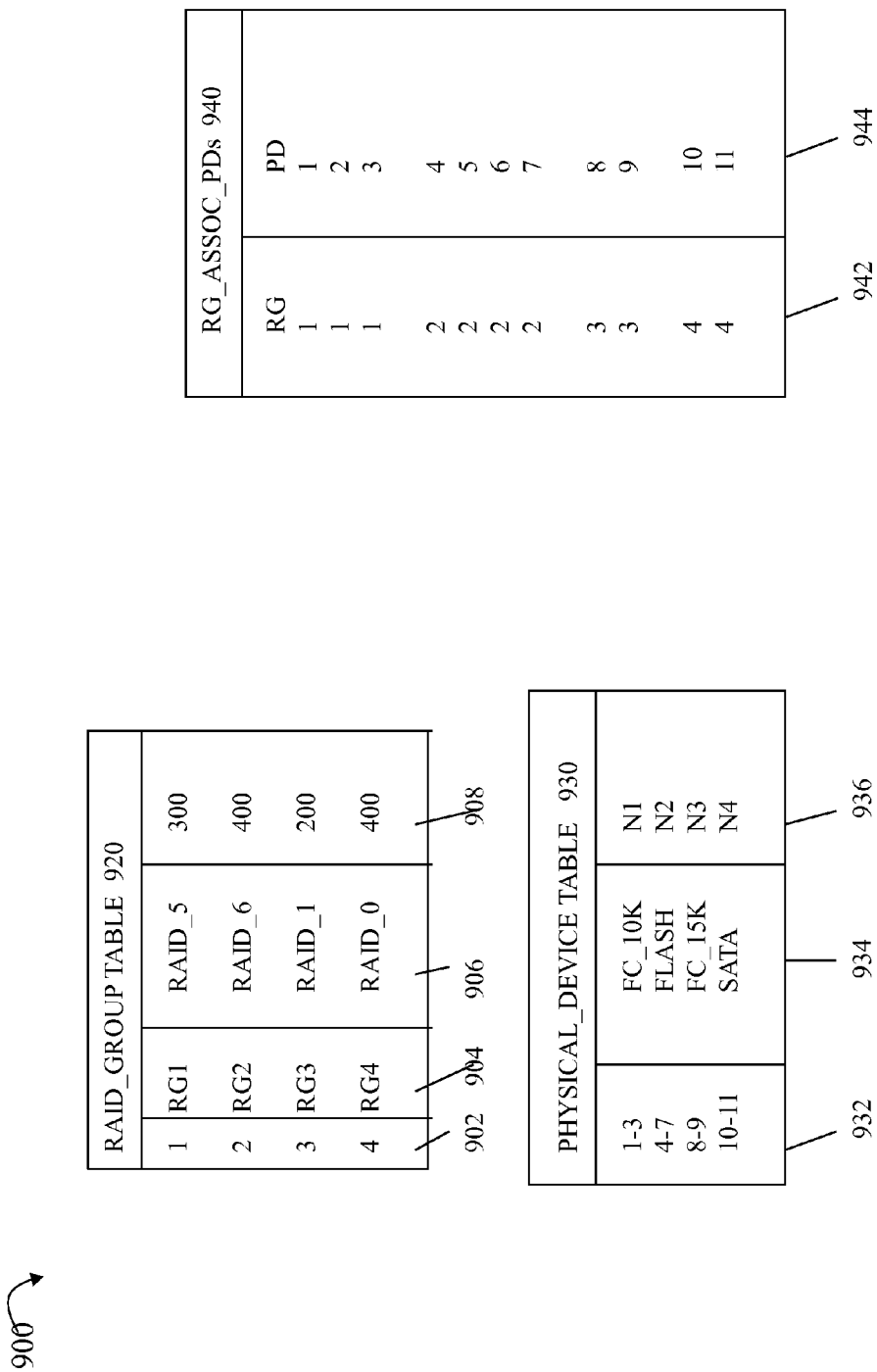

With reference to FIG. 9, shown is an example of a simulated configuration description as may be provided as an input to the simulation tool in accordance with the schema provided in FIG. 8. The example 900 represents the same information as described in FIG. 7 with the difference that the simulated configuration description of FIG. 9 is placed in a different format in accordance with the schema of FIG. 8. Columns 902, 904, 906 and 908 of table 920 include information, respectively, as included in columns 502, 504, 506 and 508 of table 520 of FIG. 7. Columns 932, 934 and 936 of table 930 include information, respectively, as included in columns 532, 534 and 536 of table 530 of FIG. 7. The associations represented by column 510 of table 520 of FIG. 7 and column 538 of table 530 of FIG. 7 are now included in information of table 940. In particular, each row of table 940 represents an association between a single RAID group (RG) identified by the foreign key in column 942 and a single PD identified by a foreign key in column 944. The foreign key in column 942 denotes a primary key of another database able, the RAID GROUP table 920. Similarly, the foreign key in column 944 denotes a primary key of another database table, the PHYSICAL_DEVICE table 930. Validation processing may include ensuring that each RAID group has an appropriate number of associated PDs based on the value of the TYPE property of the RAID group in column 906. Validation processing may also include, for example, that each PD only belongs to a single RAID group, that each PD for the same RAID group have a set of one or more common properties (e.g., the same capacity, same drive type as FC_10K, FC_15K, and the like).

The foregoing illustrates that the same information may be stored in the database in different ways depending on the database schema. The simulated configuration data generated may conform to any suitable database schema that may vary with embodiment.

The use of input files, such as described above, is one way in which information may be provided to the simulation tool in accordance with techniques herein. As another example, the simulated configuration description may be provided through use of an interactive dialogue, menu selections, and/or wizard to provide values for the properties of the objects.

Figure 10:
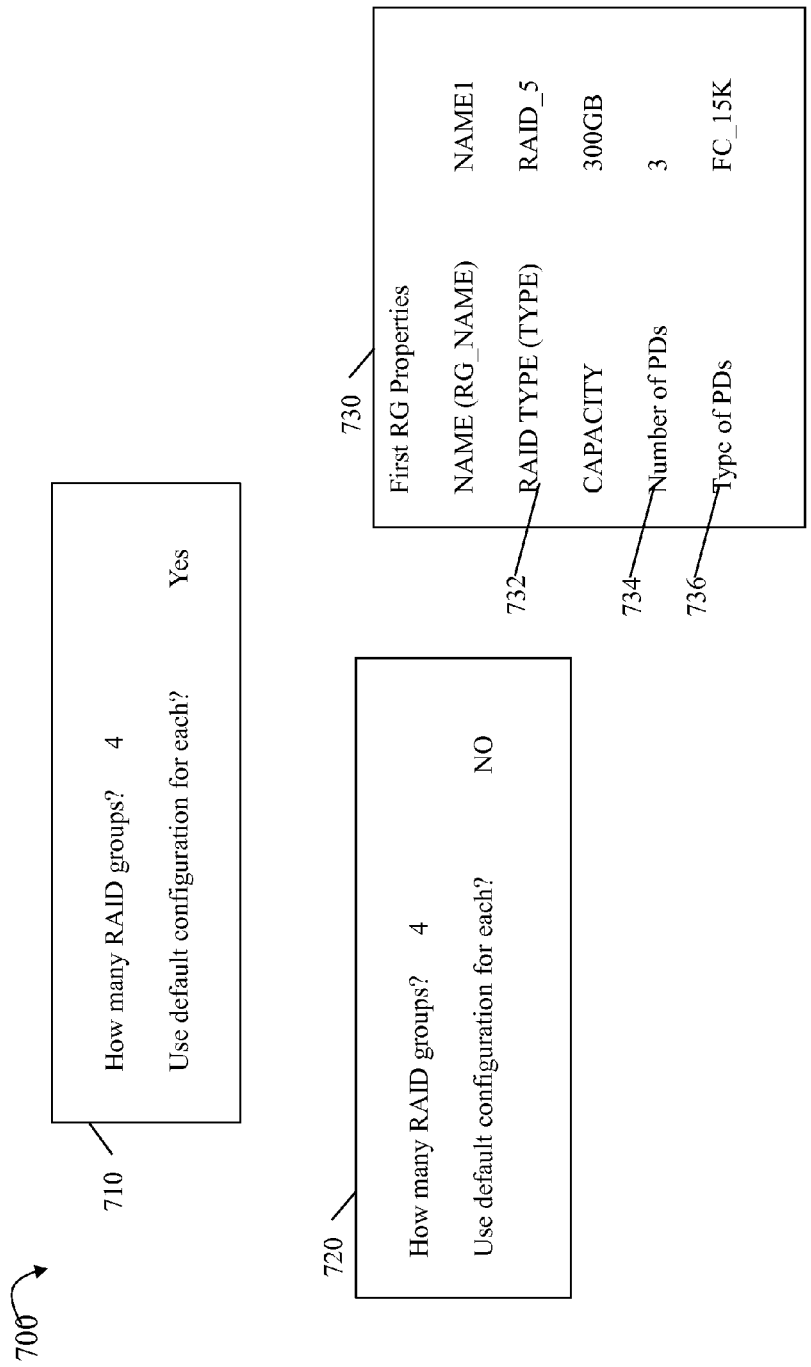
FIG. 10 is an example of user dialogues that may be used in an embodiment in accordance with techniques herein.

Referring to FIG. 10, shown are examples of screenshots of information that may be used in connection with techniques herein to obtain a simulated configuration description. The example 700 includes element 710 representing a first dialogue and set of user inputs that may be obtained. A user may be prompted to enter a first input in response to a question of how many RAID groups are to be included in the simulated configuration. In this example 710, the user enters 4 and also enters YES to indicate that the user would like the simulated configuration to have the defaults as provided by the simulation tool. Based on these two inputs of 710, the simulation tool may then automatically generate a complete, valid and consistent set of simulated configuration data for use in populating the database. The simulation tool may provide property values for 4 suitable default RAID groups, associated PDs, and the like, such as illustrated in connection with FIGS. 7 and 9.

As a second example, elements 720 and 730 may represent information included in a second different dialogue with a user. As represented in 720, a user may indicate that the simulated configuration is to include 4 RAID groups. Additionally, the user may enter NO indicating that he/she does not want to utilize all the defaults as automatically provided by the simulation tool. Responsive to entering NO in 720, the user may be presented with a screenshot of information as represented in 730 where the user may be given the opportunity through the user interface to specify property values for the RAID groups and/or PDs used in the simulated configuration. The screen 730 may be populated with a set of default values for the first RAID group. The user may modify the defaults, such as included in items 732 for RAID type and type of PDs 736. For example, the user may select a value RAID-5 as a property value for 732 denoting the RAID type for the first RAID group from a pull down menu. In response, the value specified in 734 may be updated as needed depending on the default number of PDs for the RAID based on the currently selected type of RAID_5. The user may also select a value for the type of PD 736 from a list of menu items including, for example, FLASH, FC_10K, SATA and FC_15K. In a similar manner, the user may enter other property values for remaining RAID groups of the simulated configuration. Using such UI elements to obtain the simulated configuration description denoting the values used to populate the database tables may be in accordance with the database schema and any required validation rules. For example, with reference to element 730, a validation rule may be that all PDs of the same RAID group are of the same type. Thus, an embodiment using the UI takes a single selection of a type input for 736 and applies this to all PDs of the same RAID group. As another example, a user may not be allowed to enter a value for the number of PDs which is not suitable for the selected RAID type 732. In this manner, some validation and consistency checking may be performed through the UI.

Figure 11:
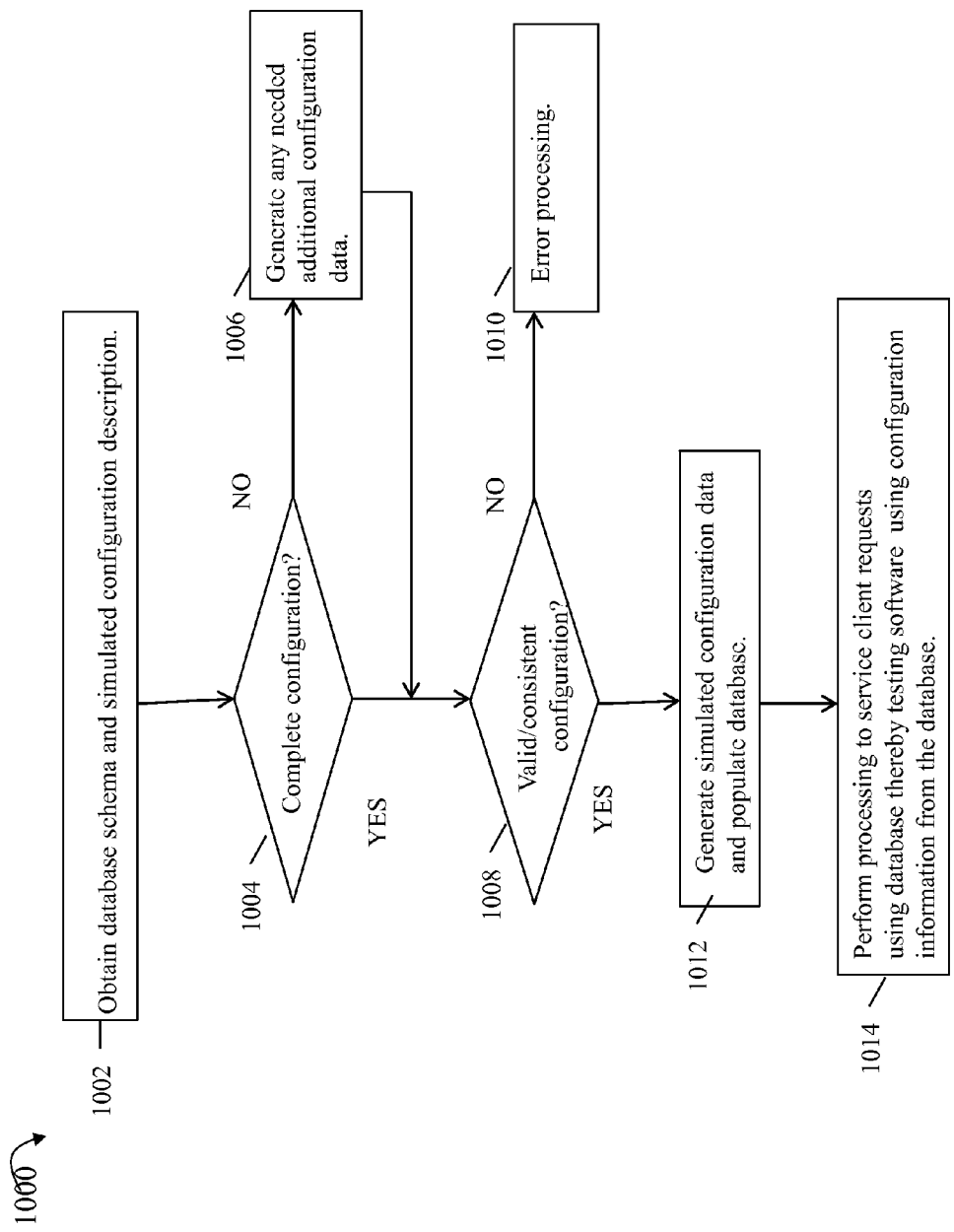
FIG. 11 is a flowchart of processing steps that may be performed in an embodiment in accordance with techniques herein.

What will now be described in connection with FIG. 11 is a flowchart of processing steps summarizing processing described above that may be performed in an embodiment in accordance with techniques herein.

With reference to FIG. 11, shown are processing steps of flowchart 1000 as may be performed in connection with providing inputs to the simulation tool to generate simulated configuration data used to populate the database. In step 1002, the database schema and simulated configuration description may be obtained. As described herein, the simulated configuration description may include defining a number of object instances and values for properties of objects using input files, interactive dialogues, menus and other user interface elements. At step 1004, a determination is made as to whether the description of the configuration data provides a complete set of configuration data such as by specifying all required property values, objects, and the like. If step 1004 evaluates to no, control proceeds to step 1006 where the simulation tool may generate any needed additional configuration data for a complete set of simulated configuration data. Step 1006 may include, for example, having the simulation tool provide one or more defaults for objects, property values, and the like. From step 1006, control proceeds to step 1008. If step 1004 evaluates to yes, control also proceeds directly to step 1008. At step 1008, a determination is made as to whether the configuration data as provided in the description alone, or in combination with any generated data in step 1006, is also valid and consistent. For example, step 1008 may include performing a check to determine whether any PD is included in two different RAID groups, whether each PD in the same RAID group is of the same type and has the same capacity, and the like. If step 1008 evaluates to no, control proceeds to step 1010 to perform error processing. If step 1008 evaluates to yes control proceeds to step 1012 to generate the simulated configuration data which is then used to populate the database. In step 1014, processing may be performed by other software that uses the simulated configuration data of the database such as to service client requests. Thus, in this manner, the software using the simulated configuration data as stored in the database may be tested.

It should be noted that the simulation tool may be used in connection with specifying a complete simulated configuration such as at a first point in time. Subsequently, the simulation tool may also be used to simulate generating updates to the existing configuration data of the database. For example, the simulation tool may take as an input information used to automatically generate a set of simulated updated configuration data, such as by adding a new single RAID group to the RAID group table, adding or deleting a PD from the configuration, and the like. In this manner, the simulated configuration description may specify property values which are incorporated as changes, additions, and/or deletions which respect to information already in the database. This may be used, for example, to test components in connection with generating indications as described elsewhere herein. It should be noted that generating such indications is described, for example, in U.S. patent application Ser. No. 12/928,653, filed Dec. 15, 2010, TECHNIQUES FOR PERFORMING INDICATION MANAGEMENT, which is incorporated by reference herein.

The techniques herein have many possible uses and applications. As mentioned above, the techniques herein may be used to generate simulated configuration data used for testing software without requiring the existence and use of any physical data storage system components. The techniques herein may be used to efficiently perform large scalability testing using the simulated configuration data. Additionally, the techniques herein may be used, for example, to efficiently set up and provide demonstrations of software using the simulated configuration data.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for simulating a data storage configuration comprising:
  generating first data describing a simulated data storage configuration of a data storage system including a plurality of physical and logical entities, said first data describing the plurality of physical and logical entities that are included in the simulated data storage system configuration;
  populating a database using said first data; and
  retrieving first information from said database in connection with processing a request from a client, wherein said first information includes at least a portion of said first data, wherein the request from the client is a data storage management operation that performs any of read and modify configuration information of the database describing the simulated data storage configuration of the data storage system, and
  wherein the first data is generated using one or more inputs and, prior to said generating, validity and consistency processing is performed that, using the one or more inputs, determines whether the simulated data storage configuration is a valid and consistent data storage configuration, said validity and consistency processing including determining whether a first logical entity is valid and consistent with respect to one or more physical entities associated with the first logical entity.

2. The method of claim 1, wherein one or more code modules are included in a runtime execution path of code modules executed in connection with processing said request and retrieving said first information.

3. The method of claim 2, wherein said one or more code modules are tested using said simulated data storage configuration information.

4. The method of claim 1, wherein said simulated data storage configuration is described using a database schema.

5. The method of claim 4, wherein said first data is generated using a simulation tool which receives said database schema as a first input.

6. The method of claim 5, wherein said database schema is a template describing one or more database tables and columns of said one or more database tables.

7. The method of claim 6, wherein each row in each of said one or more database tables represents an object, said each row including a first field identifying a primary key used to index into said each database table and to uniquely identify said object in said each database table, said each row for said object including one or more additional fields identifying one or more corresponding properties of said object identified by said each row.

8. The method of claim 7, wherein said simulation tool receives a second input including second data which describes said simulated data storage configuration and is used to populate said database, said second input being in accordance with said database schema.

9. The method of claim 8, wherein said simulation tool uses said first input and said second input in connection with generating said first data describing said simulated data storage configuration.

10. The method of claim 5, wherein said database schema is specified using said first input which is a file including metadata describing one or more database tables and columns of said one or more database tables.

11. The method of claim 9, wherein said second data defines instances of a first set of one or more objects of said one or more database tables, said second data including, for each object of said first set included in a first of said one or more database tables, a first value for a primary key of said first database table and a value for each additional property of said each object in accordance with said database schema.

12. The method of claim 11, wherein said first database table is a table of RAID groups, each row of said first table corresponding to an object representing one RAID group instance, wherein said each row of said first table includes a set of properties identifying physical devices of said one RAID group instance.

13. The method of claim 12, wherein said set of properties includes a set of foreign keys which are used to index into a second database table of physical devices.

14. The method of claim 13, wherein each foreign key in said set of foreign keys is a value for a primary key of said second database table, said each foreign key uniquely identifying a row in said second database table describing a physical device of said one RAID group instance.

15. The method of claim 11, wherein said second data specifies one or more values for object properties whereby said one or more values override default values automatically specified by said simulation tool and wherein said simulation tool automatically provides default values for properties and any required objects so that said first data describes said simulated data storage configuration as a valid and consistent configuration.

16. A system comprising a memory, the memory comprising code including:
a simulation tool that, when executed by a processor, generates first data describing a simulated data storage configuration of a data storage system including a plurality of physical and logical entities, said first data describing the plurality of physical and logical entities that are included in the simulated data storage system configuration, wherein the first data is generated using one or more inputs and, prior to generating the first data, the simulation tool performs validity and consistency processing that, using the one or more inputs, determines whether the simulated data storage configuration is a valid and consistent data storage configuration, said validity and consistency processing including determining whether a first logical entity is valid and consistent with respect to one or more physical entities associated with the first logical entity;
a database including said first data describing said simulated data storage configuration; and
one or more other code modules that, when executed by a processor, retrieve first information from said database in connection with processing a request from a client, wherein said first information includes at least a portion of said first data, wherein the request from the client is a data storage management operation that performs any of read and modify configuration information of the database describing the simulated data storage configuration of the data storage system.

17. A non-transitory computer readable medium comprising code stored thereon for simulating a data storage configuration, the non-transitory computer readable medium comprising code that, when executed by a processor, performs a method comprising:
generating first data describing a simulated data storage configuration of a data storage system including a plurality of physical and logical entities, said first data describing the plurality of physical and logical entities that are included in the simulated data storage system configuration;
populating a database using said first data; and
retrieving first information from said database in connection with processing a request from a client, wherein said first information includes at least a portion of said first data, wherein the request from the client is a data storage management operation that performs any of read and modify configuration information of the database describing the simulated data storage configuration of the data storage system, and
wherein the first data is generated using one or more inputs and, prior to said generating, validity and consistency processing is performed that, using the one or more inputs, determines whether the simulated data storage configuration is a valid and consistent data storage configuration, said validity and consistency processing including determining whether a first logical entity is valid and consistent with respect to one or more physical entities associated with the first logical entity.

18. The non-transitory computer readable medium of claim 17, wherein a simulation tool generates said first data using a first input describing a database schema of said database and a second input describing data used to populate tables of said database in accordance with the database schema.

19. The non-transitory computer readable medium of claim 18, wherein said tables of said database include a first table of RAID groups and a second table of physical devices, wherein each row of said first table describes one of said RAID groups and identifies a set of one or more physical devices of said second table included in said one RAID group, and wherein said each row of said first table includes a primary key uniquely identifying a row in said first table for said one RAID group and includes values for object properties of said one RAID group.

20. The non-transitory computer readable medium of claim 18, wherein said tables of said database include a first table of RAID groups, a second table of physical devices, and a third table of associations between RAID groups of the first table and physical devices of the second table.

* * * * *